No. 657,371. Patented Sept. 4, 1900.
D. WÈBRE.
CARRIER AND FEEDER.
(Application filed Jan. 8, 1900.)
(No Model.) 2 Sheets—Sheet 1.
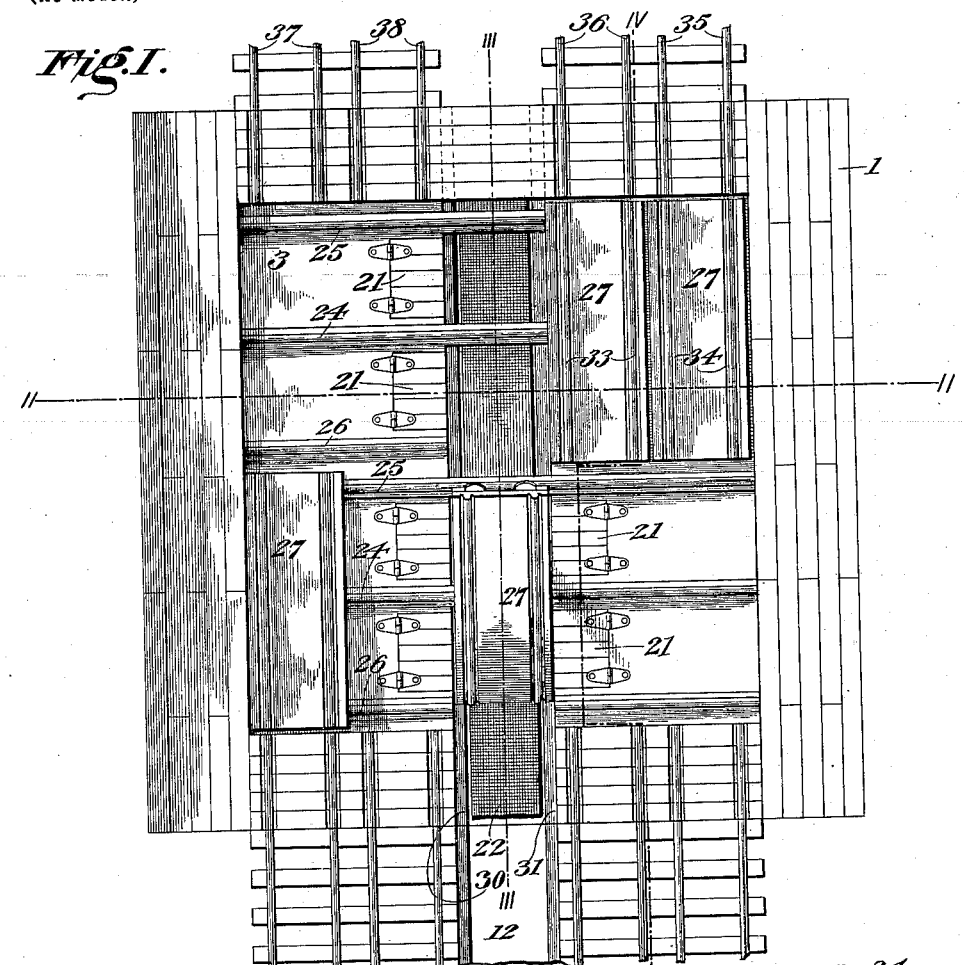
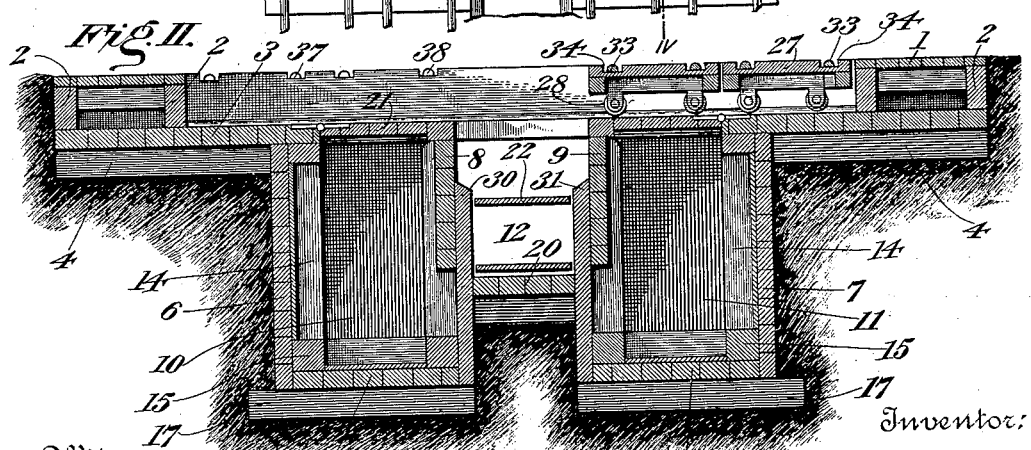
Witnesses
M. E. Fowler
Karl J. Daniel
Inventor:
Dorifor Wèbre
By Jasper L. Arkin
Attorney.

No. 657,371. Patented Sept. 4, 1900.
D. WÈBRE.
CARRIER AND FEEDER.
(Application filed Jan. 8, 1900.)
(No Model.) 2 Sheets—Sheet 2.
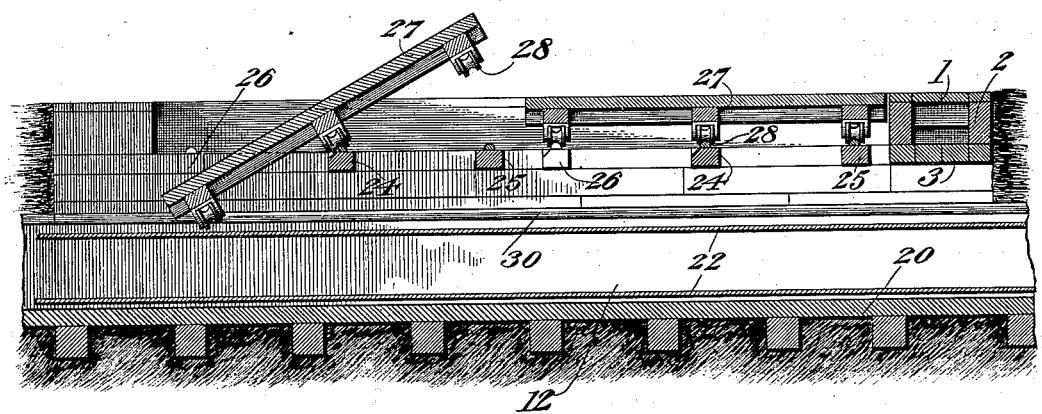
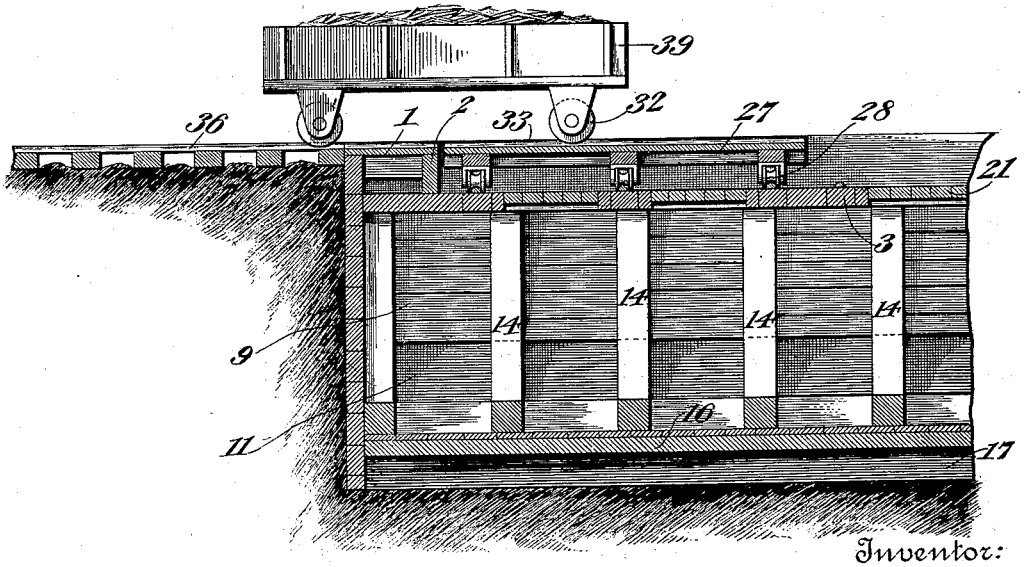

UNITED STATES PATENT OFFICE.

DORIFOR WEBRE, OF VACHERIE, LOUISIANA.

CARRIER AND FEEDER.

SPECIFICATION forming part of Letters Patent No. 657,371, dated September 4, 1900.

Application filed January 8, 1900. Serial No. 761. (No model.)

*To all whom it may concern:*

Be it known that I, DORIFOR WEBRE, of Vacherie, in the parish of St. James, State of Louisiana, have invented certain new and useful Improvements in Carriers and Feeders, of which the following is a complete specification, reference being had to the accompanying drawings.

The object of my invention is to produce improved means for delivering material and transporting it from one point to another.

My invention is specially designed to facilitate the handling of agricultural products, such as sugar-cane, and specifically for facilitating its delivery from the conveyances by which it is transported from a field to the grinding, crushing, or other machinery designed to operate upon it.

In the accompanying drawings, Figure I is a top plan view of an installation of my complete apparatus. Fig. II is a section on the line II II of Fig. I. Fig. III is a section on the line III III of Fig. I. Fig. IV is a section on the line IV IV of Fig. I.

Referring to the numerals on the drawings, in reading which comparison of the figures appears to be particularly necessary, 1 indicates a suitable platform that is preferably made of wood, preferably laid substantially flush with the surface of the ground upon which it is built. The platform 1 is supported as upon wooden pieces or beams 2, that preferably rest upon a depressed fixed platform 3, which is denominated "depressed" because it is preferably located below the surface of the ground upon which it is supported, as by sills 4.

Below the platform 3, in suitable excavations provided for them, are built, as of wood, outside lateral walls 6 and 7 and inside lateral walls 8 and 9, which define between them respectively lateral inclosures 10 and 11 and an intermediate tunnel 12. The walls 6, 7, 8, and 9 are preferably built respectively upon uprights 14, that are supported upon stringers 15, a floor 16, and bottom plates or sills 17.

The tunnel 12 is preferably provided with a sill-supported bottom 20, that is preferably supported between the side walls 8 and 9 of the tunnel.

The particular manner of building the structure above described and the material of which it is constituted are subject to wide variation as to details, the preferred form only being specified and illustrated.

The inclosures 10 and 11 are preferably closed at their opposite ends and are accessible from above, as through hinged doors 21, while the tunnel 12 is preferably open at the opposite ends of the walls 8 and 9.

The tunnel 12 is designed to accommodate a carrier movable longitudinally through it, and in the drawings I have somewhat diagrammatically illustrated, as representative of such a carrier, an endless belt 22. As clearly shown in the drawings, this belt spans the tunnel 12 and is adapted to convey through the tunnel material deposited upon it from above. In the drawings the belt is represented simply as two strips within the tunnel; but it should be understood that it is suitably supported at its opposite ends by means not illustrated and also that it is driven by a power applied through means not illustrated. Moreover, it is apparent that the upper side of the belt should be supported at intervals of requisite frequency, so as to facilitate its operation as a carrier. Such means of support may consist of suitable rollers arranged transversely through the tunnel. These and the other parts not illustrated are omitted from the drawings as being unnecessary in a diagrammatic illustration of the carrier. It is proper to observe, however, that the journals of the rollers being located in the walls 8 and 9 are made accessible from the interior of the inclosures 10 and 11, which are employed for the purposes of oiling and repairing the working parts.

Within the inclosure defined by the platform 1 and upon the depressed platform 3 I provide one or more series of tracks, each series being preferably provided with a middle continuous rail 24, a lateral continuous rail 25, and a lateral broken rail 26. (See Fig. I.) The broken rails 26 run parallel with the rails 24 and 25, but are broken away above the tunnel 12, at the side walls of which they preferably terminate. Each series of rails preferably accommodates one or more and preferably a plurality of movable platforms or trucks 27. Each of the trucks is provided with a series of grooved wheels 28, corresponding to the number of rails in each series upon the fixed platform 3, the preferred number of rails and series of wheels being, as specified, three. The wheels are grooved to correspond to the rails on which they travel, so as to afford a firm purchase upon them, and the trucks are so proportioned as that when they are mounted upon their rails their upper surfaces shall be substantially flush with the upper surface of the platform 1. Each of the trucks 27 is of a width which will permit it freely to enter longitudinally the tunnel 12 in order that it may be tilted or inclined into the tunnel, as clearly indicated in Figs. I and III, for the purpose of depositing its load upon the traveling carrier 22. For the same purpose the broken rails 26 and the intermediate rail 24 are employed, the former that they may admit the depressed end of the truck into the tunnel and the latter that it may serve as a medial pivot tilting upon which the truck may be easily manipulated.

In order to prevent the tilting end of the truck from coming into contact with the traveling carrier, I provide upon the walls 8 and 9, respectively, longitudinal guard-rails 30 and 31, which, rising above the upper level of the carrier 22, as clearly shown in Figs. II and III, serve to limit the tilting movement of the truck. In practice of course the tilting of the truck occurs but at fixed points, and guards or stop-pieces at those points would serve the purpose specified; but the extended rails are preferred, because they offer no obstruction to the free movement of the carrier through the tunnel. It should be observed, however, that other means of limiting the tilting movement of the trucks might readily be substituted for those specified.

The trucks 27 are designed to receive upon them a vehicle—such, for example, as a car or cart—that is loaded with the material to be deposited upon the carrier 22. It is for that reason that their upper surfaces are made flush with the upper surface of the platform 1 in order that the vehicle may be driven or propelled from the field upon which the platform 1 is built directly upon the truck. In the drawings I have illustrated the trucks 27 as adapted to accommodate a tram-car. (Shown in Fig. IV and indicated by the reference-numeral 39.) The car 39 is provided with flanged wheels 32, to accommodate which each of the trucks 27 is provided with rails 33, that are preferably countersunk into grooves 34, provided for them.

Upon opposite sides of the tunnel 12 I provide at opposite ends of the platform 1 a series of tracks 35 and 36 and 37 and 38, respectively. The rails of each track are adapted to aline with the rails 33 on the respective trucks, of which, as illustrated, two sets are employed, and to accommodate the respective sets the tracks at the opposite ends of the platform 1 are provided.

In practice the operation of my device is as follows: The trucks 27 of each series are all shifted to one side of the platform 3 and, if adapted to accommodate cars 39, are thus brought into position in which their respective rails 33 aline with those of the tracks upon the platform 1. The truck 27 nearer the tunnel 12 is loaded and dumped by tilting, as illustrated. The loading consists in superimposing upon it a car 39 or cart, whichever may be used, and by the tilting of the truck the contents of the car or cart are dumped upon the carrier. In this connection it should be observed that in practice means should be employed for preventing the car or cart from running off of the truck when the latter is tilted. After dumping it is shifted along the rails 24, 25, and 26 to that side of the platform 3 that is opposite to the remaining unloaded truck of the series. Its car in that position may be taken off, as upon the track 35, and in the like manner the next truck may be loaded, dumped, and shifted. As fast as each series is carried through the operation described its trucks may be operated in the reverse manner, and so the process may be made practically continuous and the carrier 22 kept continuously loaded. This may be accomplished through the employment of two series of trucks 27, as illustrated in the drawings, each series being independently operated in the manner specified. It might be practicable to employ in each series a greater number of trucks than two; but two are believed to be sufficient in practice and are certainly sufficient to illustrate the principle of my invention.

The mode of operation above described may be varied by working each truck of a series alternately back and forth from opposite sides; but that is a mere detail of operation which has nothing to do with the patentable features of my invention.

What I claim is—

1. In a carrier and feeder the combination with an excavated tunnel and carrier working longitudinally within the tunnel, of a platform built flush with the earth and opening into the tunnel from above, said platform adapted to accommodate a vehicle for loading the carrier, substantially as set forth.

2. In a carrier and feeder the combination with a platform built flush with the earth, an excavated tunnel, and a carrier working longitudinally therein, of a vehicle upon the platform, and means for discharging contents of the vehicle from above, upon the carrier, substantially as set forth.

3. The combination with a platform, aperture therein, and carrier working in the aperture, of a plurality of rails upon the platform, including a medial rail and a broken lateral rail, a movable platform traveling upon said rails and adapted to be tilted on the medial rail into the aperture above the carrier, substantially as set forth.

4. The combination with a platform, aperture therein, and carrier working in the aperture, of a plurality of rails upon the platform, including a medial rail and a broken lateral rail, a movable platform traveling upon said rails and adapted to be tilted on the medial rail into the aperture above the carrier, and means for limiting said tilting movement, substantially as set forth.

5. In a carrier and feeder the combination with a platform, depressed platform, tunnel therein, and carrier working longitudinally within the tunnel, of a movable platform upon the depressed platform and having its upper surface flush with the surface of the first-named platform, and means for discharging a load from the movable platform to the carrier, substantially as set forth.

6. The combination with a platform provided with one or more tracks, a depressed platform, aperture therein, and carrier working in the aperture, of a movable platform upon the depressed platform, whose surface is flush with that of the first-named platform, tracks upon the movable platform adapted to aline with each track upon the first-named platform, and means for discharging a load from the movable platform upon the carrier, substantially as set forth.

In testimony of all which I have hereunto subscribed my name.

DORIFOR WÈBRE.

Witnesses:
G. DAMARÉ,
JOSEPH DAMARÉ.